United States Patent [19]

Bourgeaux et al.

[11] Patent Number: 4,841,297
[45] Date of Patent: Jun. 20, 1989

[54] DISPLACEMENT CODER

[75] Inventors: Pierre Bourgeaux, Lachat; Alain Riaud, Lathuille, both of France

[73] Assignee: S.A. Des Etablissements Staubli, Faverges, France

[21] Appl. No.: 155,588

[22] Filed: Feb. 12, 1988

[51] Int. Cl.⁴ ............................................. H03M 1/24
[52] U.S. Cl. ......................................... 341/11; 341/13; 341/15; 341/1; 250/231 SE
[58] Field of Search ..................... 341/2, 4, 6, 9, 10, 341/13, 14, 15, 111, 112, 116, 142, 1, 11, 155; 250/231 SE; 340/870.28, 870.29

[56] References Cited

U.S. PATENT DOCUMENTS 3,916,186 10/1975 Raser ..................................... 341/13
4,041,483  8/1977 Groff ................................ 340/347 P
4,358,753 11/1982 Cascini ................................. 341/13
4,363,026 12/1982 Salmon ............................ 340/347 P
4,740,690  4/1988 Mosier ................................. 341/13

FOREIGN PATENT DOCUMENTS 1565400 4/1980 United Kingdom .

Primary Examiner—William M. Shoop, Jr.
Assistant Examiner—Brian Young
Attorney, Agent, or Firm—Dowell & Dowell

[57] ABSTRACT

A displacement coder of the differential type wherein, in order to reduce the dimensions thereof, a first disk is rotatably connected to a principal shaft coupled to the shaft which controls the displacement of a mobile member being monitored and a second disk which is coaxially mounted on the principal shaft but which is rotated in a ratio of slightly less than 1 to 1 with respect to the first disk through a driving connection which includes a common pinion and two tooth wheels which wheels are also mounted along the principal shaft.

1 Claim, 2 Drawing Sheets

DISPLACEMENT CODER

BACKGROUND OF THE INVENTION

1. Field of the Invention

The present invention relates to displacement coders which, in robots, automata, machining centers and other automatic machines, are associated with the different mobile members with a view to locating the exact position of each of them in the sequence of displacements.

2. History of the Related Art

Between the absolute direct-reading coders and the incremental coders having relative count-down, intermediate systems are known in which the precise reading of the positioning is effected by a so-called operation of calibration which consists in displacing the mobile member in order to find the position thereof by counting pulses.

U.S. Pats. Nos. 4,363,026 to SALMON and 4,041,484 to GROFF and British Pat. No. 1,565,400 400 to OTIS ELEVATOR CO., for example, propose displacement coders comprising a first disc angularly connected to the displacement of the member in question, a second disc rotatably connected to the first in a ratio close to 1 but different from this value, and pulse counting means associated with each of the discs for revealing the angular shift existing therebetween.

In this way, precise data are obtained at a cost much lower than that of the absolute coders, by means of a prior operation of calibration of much reduced amplitude, not capable of being hindered by the surroundings of the mobile member to be verified. However, the dimensions of these coders which may be qualified as "differential" are large and hinder installation thereof, and their structure is complicated.

SUMMARY OF THE INVENTION

It is a principal object of the present invention to overcome the aforementioned drawbacks, by providing a displacement coder of the differential type, characterized in that the first disc is fitted on a principal shaft secured to the mobile member being monitored while the second disc is mounted idly on the principal shaft, so that the two discs are disposed coaxially thereon. The disks are connected together via two toothed wheels which are themselves disposed coaxially on the principal shaft and which cooperate with a common pinion carried by a secondary shaft oriented parallel to the principal shaft.

BRIEF DESCRIPTION OF THE DRAWING

The invention will be more readily understood on reading the following description with reference to the accompanying drawings, in which.

DESCRIPTION OF THE PREFERRED EMBODIMENT

Figure 1:
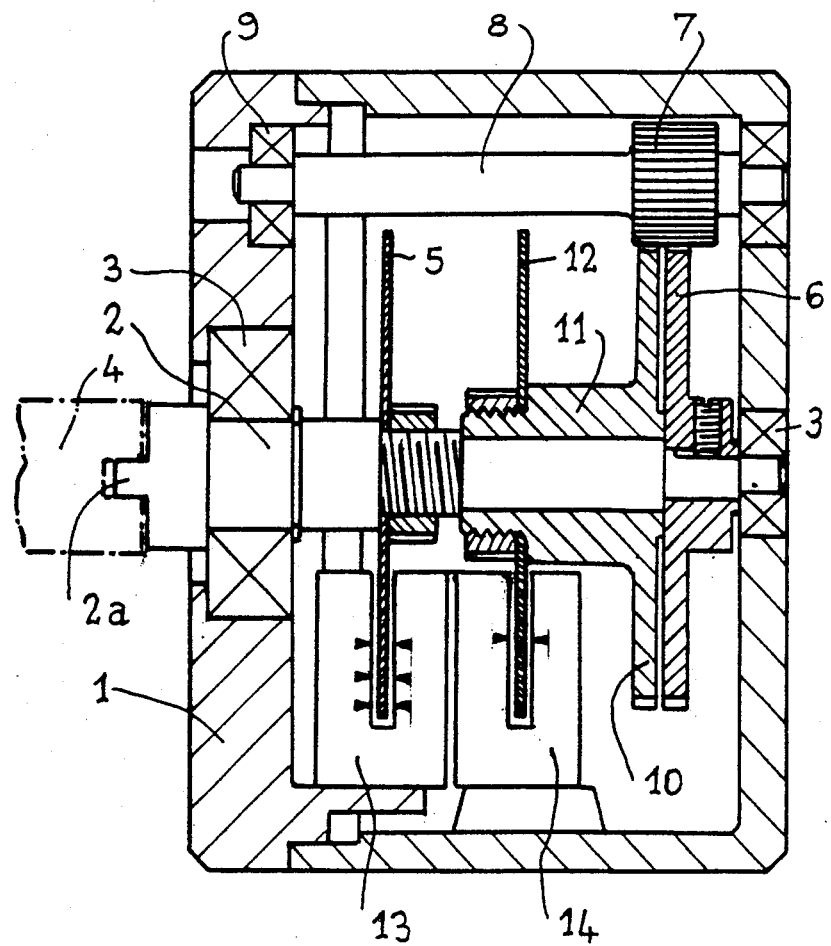
FIG. 1 is a schematic axial section illustrating the arrangement of the coder according to the invention.

Referring now to the drawings, in FIG. 1, reference 1 designates a casing inside which axially rotates a principal shaft 2 supported in two opposite bearings 3. One of the ends of this shaft 2 projects outside the casing 1 and is shaped at 2a so as to allow coupling thereof with the shaft 4 which ensures control of the angular or linear displacement of the mobile member of the machine whose position it is desired to locate at any moment.

On the principal shaft 2 are fitted a disc 5 and a toothed wheel 6 both of which mesh with a pinion 7 secured to a secondary shaft 8 mounted idly inside bearings 9 provided in the casing 1. The pinion 7 meshes simultaneously with a second toothed wheel 10 secured with a hub 11 which rotates freely on shaft 2 to the rear of disc 5. On this hub 11 is fitted a second rotating disc, referenced 12.

It should be observed that the wheels 6 and 10 comprise very slightly different numbers of teeth (a difference of one tooth suffices) so that, due to this differential linkage, the two discs 5 and 12 are rendered rotatably secured in a ratio close to 1, but different from this value.

In order to fix ideas by a precise example, which, however, presents no limiting character, it may be supposed that the toothed wheel 6 connected to shaft 2 and to disc 5 has 125 teeth, while toothed wheel 10 connected to hub 11 and to disc 12 includes only 124, with the result that, when disc 5 has made 124 revolutions, disc 12 will have made 125.

Figure 2:
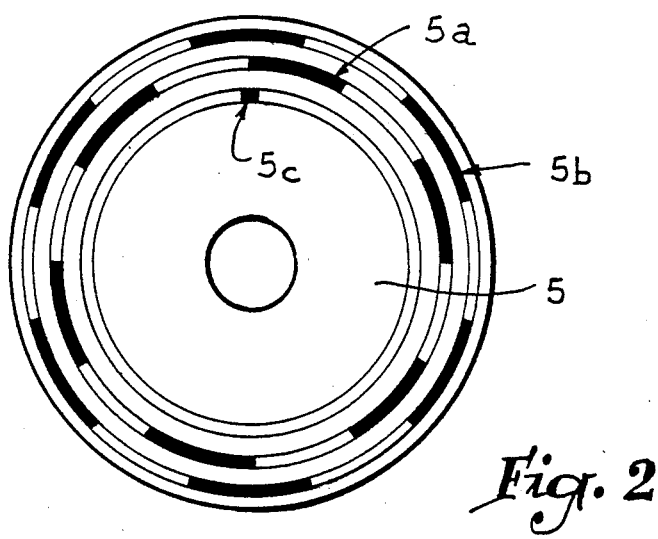
FIGS. 2 and 3 are views in elevation showing each of the two rotating discs of the apparatus according to FIG. 1.
Figure 3:
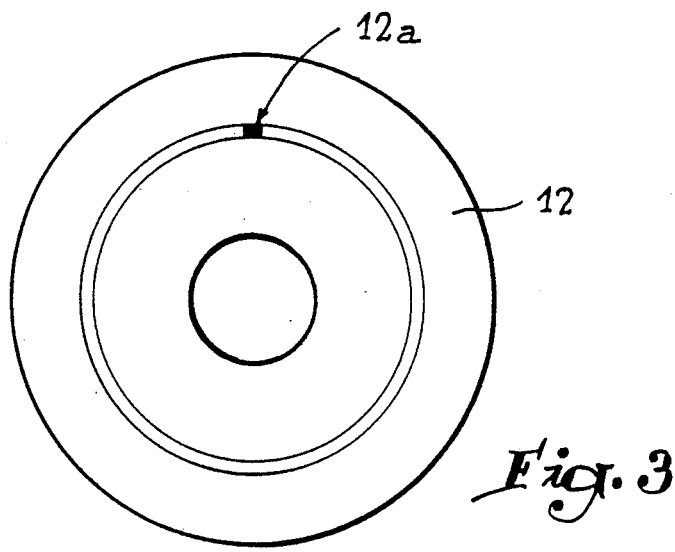

As shown in FIG. 2, the disc 5 comprises three concentric scales or tracks referenced 5a, 205b and 5c respectively. The two tracks 5a and 5b comprise the same number of marks, but the track 5a are offset angularly from one track to the other; track 5c may comprise a variable number of marks, one only in the embodiment shown. In the manner illustrated in FIG. 3, disc 12 comprises only one track 12a having a number of marks equal to that of track 5c of disc 5, viz. one in the example shown.

With each of these discs 5 and 12 is associated a detector 13, 14, respectively, comprising a number of detection members obviously equal to that of the tracks on the disc which corresponds thereto. The nature of these detection members depends on that of the marks which constitute the tracks of discs 5 and 12; they may be photoelectric cells, magnetic sensors or any other apparatus adapted to generate an incremental pulse upon passage of each mark of the corresponding track during rotation of the discs 5 and 12, which pulse is transmitted to a counting apparatus enclosed in the control cabinet of the machine in question.

Operation of the coder described above is similar to that of the conventional apparatus of the same type. It will be assumed that the coder is fixed to the rear of the motor which ensures linear displacement of the arm of a robot or automation. Discs 5 and 12 were previously adjusted so that, at half the stroke of the arm in question, the marks of tracks 5c and 12a are simultaneously in register with the corresponding detection member of one and the other of the two detectors 13 and 14.

In the course of operation of the machine, the arm in question will of course move on either side of this central position, ensuring rotation of the two discs 5 and 12. However, further to the differential linkage effected by the toothed wheels 6 and 10 and the common pinion 7, the marks of tracks 5c and 12a will be offset with respect to one another, so that, at any moment, in order to determine the position of the arm of the robot, it suffices to displace this arm over a maximum distance corresponding to one revolution and to read the angular shift between the two tracks or marks 5c and 12a, such reading being effected by counting pulses at the level of tracks 5*a* and 5*b* of disc 5.

Counting of pulses generated by the detectors 13 and 14 upon passage of the marks of tracks 5*c* and 12*a* of discs 5 and 12 does not involve any analog processing, with the result that it is simple and reliable. Moreover and in particular, the apparatus is of much reduced dimensions and is consequently capable of being very easily installed on the machine at each of the mobile members thereof.

What is claimed is:

1. A displacement coder for determining the position of a movable component of a machine comprising a casing, a primary shaft rotatably supported within said casing, a first disk means fixedly mounted to said primary shaft, said first disk means having concentric scales, first pulse counting means for detecting said concentric scales of said first disk means, a hub means mounted to said primary shaft and being freely rotatable with respect thereto, a second disk means carried by said hub means, said second disk means having a scale, second pulse counting means for detecting said scale of said second disk means, a first wheel extending outwardly from said hub means and having a plurality of peripheral teeth, a second shaft means disposed within said casing generally parallel to said primary shaft means, a pinion means mounted on said secondary shaft means, said teeth of said first wheel means being drivingly meshed with said pinion means, a second wheel means fixedly mounted to said primary shaft and having a plurality of peripheral teeth, said teeth of said second wheel means being drivingly meshed with said pinion means, said first wheel means having at least one less tooth than said second wheel means so that said second disk means will be rotatably driven in a ratio with respect to said first disk means of less than but substantially equal to one to one, and means for drivingly connecting said principal shaft to the movable component.

* * * * *